Feb. 29, 1944.   J. R. MILES   2,342,681
FOCUSING CAMERA
Filed June 29, 1940   2 Sheets-Sheet 1

JOHN R. MILES
INVENTOR

BY Bartholomew Diggins
ATTORNEY

Feb. 29, 1944.   J. R. MILES   2,342,681
FOCUSING CAMERA
Filed June 29, 1940   2 Sheets-Sheet 2

JOHN R. MILES
INVENTOR

BY Bartholomew Diggins
ATTORNEY

Patented Feb. 29, 1944

2,342,681

UNITED STATES PATENT OFFICE 2,342,681

FOCUSING CAMERA

John R. Miles, Ann Arbor, Mich., assignor to International Industries, Inc., Ann Arbor, Mich., a corporation of Michigan Application June 29, 1940, Serial No. 343,145

7 Claims. (Cl. 95—44)

The present invention relates to photographic cameras, and more particularly to focusing cameras.

One of the objects of the present invention is to provide a focusing photographic camera which is simple and inexpensive in construction, yet rugged and accurate in operation. Another object is to provide a photographic camera having a very simple and inexpensive range finder for focusing. A further object is to provide a focusing photographic camera in which the range finder image may be seen through the view finder. A still further object is to provide a folding photographic camera in which the movable element of a focusing range finder is carried by the lens board. These and other objects and advantages reside in certain novel features of construction, arrangement and combination of parts as will hereinafter be more fully set forth and pointed out in the appended claims.

Figure 1:
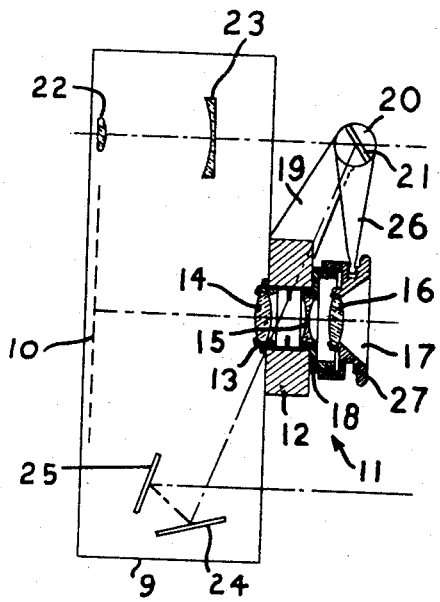
Figure 2:
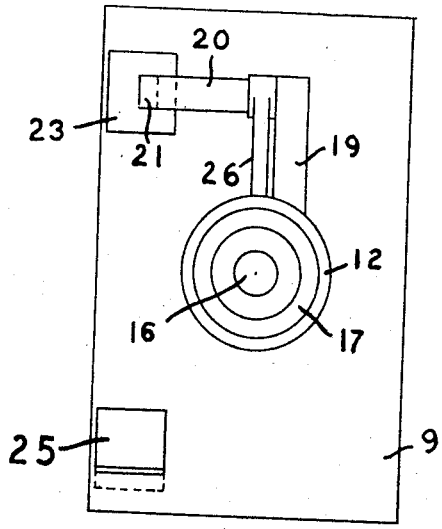
Figure 3:
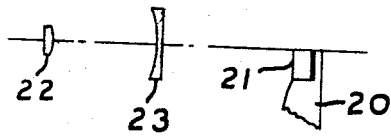
Figure 4:
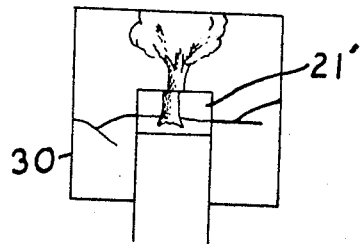
Figure 5:
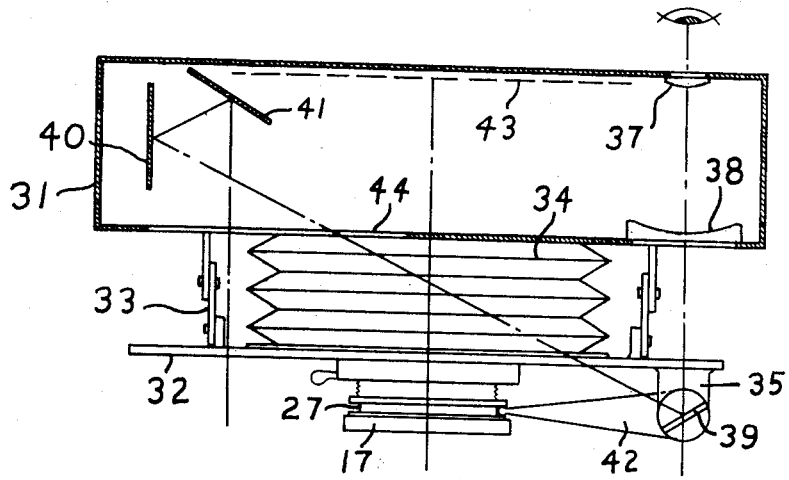
Figure 6:
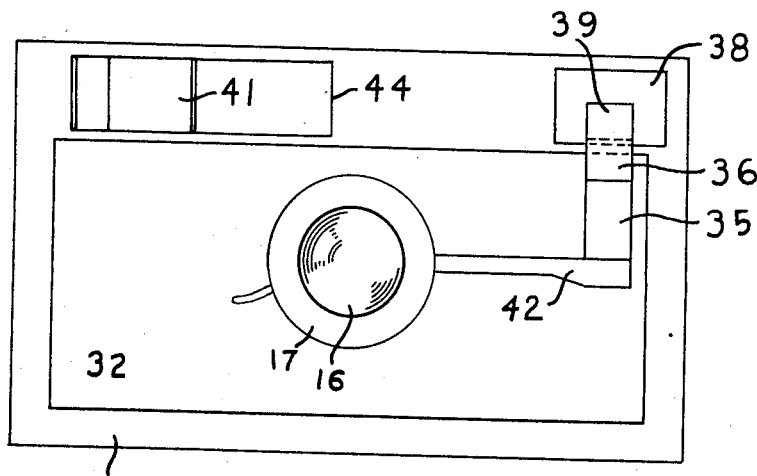

In the drawings, Figure 1 is a diagrammatic sectional view of a camera embodying my invention. Figure 2 is a front elevation thereof. Figure 3 is a side elevation showing the view finder and range finder mirror. Figure 4 shows the view as seen through the view finder. Figure 5 is a diagrammatic plan view of a modified form of camera embodying my invention. Figure 6 is a front elevation of the camera shown in Figure 5.

In the embodiment of my invention illustrated in Figures 1, 2 and 3, 9 designates generally the camera body having a film plane 10. Mounted on the front of the camera opposite the film plane 10 and in alignment therewith is a photographic objective designated generally at 11. While any type objective may be used, I have shown and prefer a front element focusing objective such as is well known in the art.

As illustrated in the drawings, a shutter ring 12 is secured to the housing or body 9 and carries the usual shutter blades 13. The lens illustrated is of the type generally designated by the term "Cooke," and consists of a positive rear element 14, a negative center element 15, and a positive front element 16. The rear elements 14 and 15 are fixed with relation to the film plane 10, while the front element 16 is mounted in a cell 17 which is adjustably threaded on a cell 18, carrying the negative lens 15. Upon rotating the cell 17, the lens 16 moves back and forth relative to the lenses 14 and 15, and thus alters the front focus of the objective as a whole.

Secured to the shutter ring 12 or to the front of the camera body 9 and projecting outwardly therefrom is a bracket 19. A support 20 is pivotally mounted on this bracket 19 and carries at its end a mirror or reflector 21. This mirror or reflector 21 is positioned directly in the path of the usual reversed Galilean viewfinder consisting of the usual positive lens 22 and negative lens 23. This viewfinder has its optical axis substantially parallel to the optical axis of the photographic objective.

As the opposite end of the camera housing 9 are two reflectors 24 and 25. The reflector 25 receives light along an axis substantially parallel to the axes of the viewfinder and objective, and reflects this light to the reflector 24. From the reflector 24 the incoming light is directed to reflector 21, and thence into the viewfinder along its optical axis.

A lever arm 26 is rigidly attached at one end to the support 20, while its free end engages in an annular groove 27 in the adjustable lens cell 17. In operation, the lens cell 17 is rotated to focus an image on the film plane 11 and this movement causes pivotal movement of the mirror 21 through the operation of the lever 26 and groove 27. This movement of the mirror 21 changes the angle of the light received by reflector 25 and ultimately deflects it along the optical axis of the Galilean viewfinder.

Referring to Figure 4, the outer frame 30 shows the entire view seen through the viewfinder and the small frame 21'. The view directed into the viewfinder by the reflector 21 is indicated by the small frame 21'.

Upon adjusting the lens cell 17 until the portion 21' corresponds and coincides with the immediately adjacent portion of the view 30, the objective is brought into accurate and exact focus.

Figures 5 and 6 illustrate the application of my invention to a folding type camera. In this modification, the camera body is designated at 31 and a lens board 32 is suitably adjustably secured thereto by pivoted links 33 in any suitable manner well known in the art. The usual collapsible bellows 34 forms a light tight connection between the lens board 32 and the camera body 31.

I prefer to use a folding mechanism of the type in which the lens board 32 is moved to a fixed and rigid position, and focusing is accomplished by adjusting the objective. In this modification, I prefer to use the same type of objective lens as that illustrated in Figure 1, that is, a front element focusing objective which may be focused by rotating the lens cell 17. A bracket 35 is rigidly fixed on the lens board 32 and carries the pivoted support 36 which projects into the path of the viewfinder formed by lenses 37 and 38.

A mirror 39 fixed on the support 36, faces the viewfinder as in the previous modification. The two mirrors 40 and 41 direct light to the mirror 39 as in Figure 1. A lever arm 42 rigidly fixed to the support 36, extends into the groove 27 of the lens cell 17. As in the previous modification, the lens cell 17 is rotated until the mirror 39 reflects an image into the viewfinder which corresponds and coincides with that formed by the viewfinder. When the lens is in this position, the image is formed in the film plane 43.

In the modification shown in Figures 5 and 6, the viewfinder and the reflectors 40 and 41 are preferably located in a sub-housing which extends upward beyond the film compartment and the lens board 32. A large window 44 in the front of this sub-housing permits light to enter and be reflected from the reflectors 39 and 40 to the mirror 30.

While I have illustrated my invention in connection with the photographic objective of the front element focusing type, it is obvious to those skilled in the art that any type of objective could be used. I prefer a front element focusing objective for this type of camera because the focus may be varied by simply rotating the front element without disturbing the position of the shutter. It is also apparent that a single reflector could be used in place of the pairs 24, 25 and 40, 41. A single reflector would require moving the pivoted reflector in a direction opposite to the movement of the objective. I, therefore, prefer the use of the reflector pairs because of the mechanical simplification. It is also apparent that I may use other types of viewfinder without departing from the spirit of my invention.

From the foregoing, it will be apparent that I am able to attain the objects of my invention and provide a simple and inexpensive focusing camera in which the focusing range and field of view may be simultaneously obtained.

I claim:

1. A photographic camera comprising a camera body, an objective having a fixed back focus and an element movable to vary the front focus, a viewfinder, a focusing rangefinder comprising reflecting means fixed on said camera body and facing in the same direction as said viewfinder, a reflector adjustably carried by said camera in the direct field of view of said viewfinder for receiving light from said reflecting means and directing it into said viewfinder, and motion transmitting means operatively interconnecting said reflector and the movable element of said objective whereby adjustment of said movable element actuates said reflector.

2. A folding camera comprising a camera body, a lens board adjustably secured to said camera body for movement between an inoperative position to a fixed operative position, an objective adjustably carried by said lens board, means for adjusting said objective for focusing, a viewfinder carried by said camera body with its optical axis spaced from and substantially parallel to the optical axis of said objective, reflecting means carried by said camera body in spaced relation to said viewfinder and facing in the same direction, a reflector pivotally mounted on said lens board in the direct field of view of said viewfinder and facing the viewfinder and reflecting means, the pivotal axis of said reflector being substantially perpendicular to the plane of the viewfinder and reflecting means, and motion transmitting means for operatively interconnecting said objective and said reflector whereby adjustment of said objective pivots said reflector.

3. A folding camera comprising a camera body, a lens board adjustably secured to said camera body for movement between an inoperative position to a fixed operative position, an objective carried by said lens board having a fixed back focus and an element adjustably mounted on said lens board for varying the front focus, a view finder carried by said camera body with its optical axis spaced from and substantially parallel to the optical axis of said objective, reflecting means carried by said camera body in spaced relation to said viewfinder and facing in substantially the same direction, a reflector pivotally mounted on said lens board in the direct field of view of said viewfinder and facing the viewfinder and reflecting means, the pivotal axis of said reflector being substantially perpendicular to the plane of the viewfinder and reflecting means, and motion transmitting means for operatively interconnecting said reflector and the adjustable element of said objective whereby adjustment of said adjustable element pivots said reflector.

4. A photographic camera comprising a camera body, an objective adjustably carried by said camera body, a viewfinder carried by said camera body, the optical axis of said viewfinder being spaced from and substantially parallel to the optical axis of said objective, reflecting means carried by said camera body in spaced relation to said viewfinder and facing in the same direction as said viewfinder, a reflector pivotally carried by the camera body in the direct field of view of said viewfinder facing said viewfinder and reflecting means, the pivotal axis of said reflector being substantially perpendicular to the plane of said viewfinder and reflecting means, and motion transmitting means operatively interconnecting said reflector and said objective whereby adjustment of said objective pivots said reflector.

5. A photographic camera comprising a camera body, an objective carried by said camera body, said objective having a fixed back focus and an element movable to vary the front focus, a viewfinder carried by said camera body, the optical axis of said viewfinder being spaced from and substantially parallel to the optical axis of said objective, reflecting means carried by said camera body in spaced relation to said viewfinder and facing in the same direction as said viewfinder, a reflector pivotally carried by the camera body in the direct field of view of said viewfinder, facing said viewfinder and reflecting means, the pivotal axis of said reflector being substantially perpendicular to the plane of said viewfinder and reflecting means, and motion transmitting means operatively interconnecting said reflector and the movable element of said objective whereby adjustment of said movable element pivots said reflector.

6. In a photographic camera, a view finder, an objective lens mounted on a front wall of said camera, said objective lens having a fixed back focus and an adjustable front element for varying the front focus, and focusing range finder means comprising a support projecting from said front wall of said camera, a reflector pivotally mounted on said support adjacent said objective and in the direct field of view of said view finder, a stationary reflector on said camera mounted to direct light from the object viewed through said view finder onto said pivoted reflector and facing in the same direction as said view finder, and motion transmitting linkage operatively interconnecting said pivoted reflector and said adjustable front element.

7. In a photographic camera, a view finder, an objective lens cell fixed to a front wall of said camera and a lens cell containing the front element of said objective movably mounted on said fixed cell for varying the front focus of said objective, a support projecting from said front wall of said camera, a reflector pivoted on said support adjacent said objective and in the direct field of view of said view finder, a stationary reflector on said camera mounted to direct light from the object viewed through said view finder into said pivoted reflector, and motion transmitting means operatively interconnecting said pivoted reflector and said movable lens cell.

JOHN R. MILES.